July 6, 1965 R. T. HOOD, JR 3,193,635
STATION IDENTIFYING PLUG-RECEPTACLE ASSEMBLY
FOR DATA ACQUISITION SYSTEM
Filed Jan. 29, 1963 2 Sheets-Sheet 1

INVENTOR:
R. T. Hood, Jr.
By Keith D. Beecher
Attorney

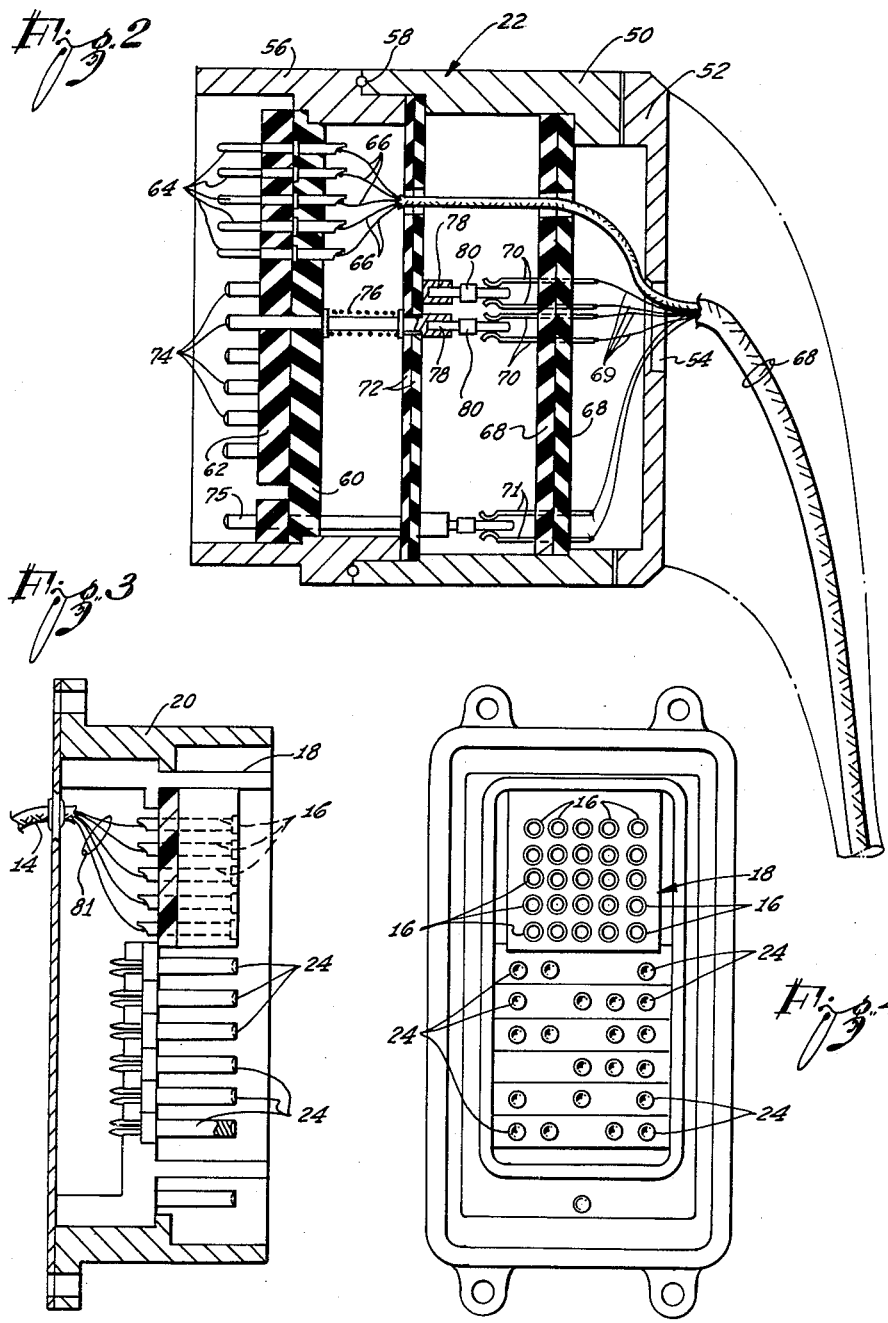

United States Patent Office 3,193,635
Patented July 6, 1965

3,193,635
STATION IDENTIFYING PLUG-RECEPTACLE ASSEMBLY FOR DATA ACQUISITION SYSTEM
R. T. Hood, Jr., 4705 W. 191st St., Torrance, Calif.
Filed Jan. 29, 1963, Ser. No. 254,620
3 Claims. (Cl. 200—51.03)

The present invention relates to improved apparatus for acquiring data from a meter, or the like; and it relates more particularly to an improved plug-receptacle assembly for electrically connecting a recording mechanism to a source of data to be recorded by the mechanism.

The improved plug-receptacle assembly of the invention will be described in conjunction with a data acquisition system for use in reading utility meters, such as the usual domestic watt-hour meter. However, the plug-receptacle assembly of the invention has general utility.

At present, the readings of the domestic watt-hour meters are periodically made by an inspector who is an employee of the utility company. The readings are usually entered by the inspector in a route book, and they are later transposed at a central billing station into a form suitable for processing by an electronic data processing billing machine.

The method of reading domestic utility meters, as described in the preceding paragraph, is slow, inefficient, and subject to error. Copending application Serial No. 252,726, filed January 21, 1963, discloses a system in which the meter readings are made automatically, and data corresponding to such readings is acquired in a form such that it can be fed directly into the electronic data processor at the central station. The system of the copending application utilizes a magnetic recording mechanism which the inspector carries from meter to meter.

The magnetic recording mechanism is plugged in at each meter station by the inspector; and it is caused to record, not only data representative of the meter readings, but also data indicating the serial number of each particular meter station, and other pertinent information, such as, for example, the area code and rate code.

In one embodiment of the system described in the copending application, suitable analog-digital converters are provided in each meter to convert the meter readings into binary-coded digital data. This binary-coded data is recorded in the magnetic recording mechanism carried by the inspector and plugged into a suitable receptacle at each meter station.

Each meter station in the system of the copending application is provided with a source of binary-coded data. This data represents the serial number of the particular station, as well as other information, as mentioned above. This latter binary-coded data is also recorded in the magnetic recording mechanism concurrently with the meter reading data.

The present invention provides an electrical plug-receptacle assembly which includes, in the embodiment to be described, a plug to be connected to the recording mechanism and a receptacle for the plug which is connected to the analog-digital converter in the meter. Each meter station is provided with a receptacle, and the plug is plugged by the inspector into each receptacle as the recording mechanism is carried by him from station to station.

The receptacle to be described is provided with a plurality of independent switch-actuating pins, and the recorder plug is provided with a plurality of switches. Different ones of the switches in the plug are actuated by the actuating pins, as the plug is plugged into the different receptacles in the meter stations.

The receptacles of the invention are constructed so that selected ones of the switch actuating pins in any receptacle can be easily fractured from the receptacle and removed. With this construction, selected switch actuating pins can be removed so as to form any desired pattern of remaining switch actuating pins in the individual receptacles. In this manner, the switch-actuating pins in the different receptacles can all be arranged in different patterns, so that different binary-code serial numbers are represented thereby in the different receptacles.

Then, when the plug is plugged into any one of the different receptacles, only those switches in the plug corresponding to the remaining actuating pins in the respective receptacles will be actuated. The actuated and unactuated switches in the plug, when it is plugged into any particular receptacle, establishes a binary-coded pattern which represents, for example, the serial number and other pertinent data, related to the corresponding meter station. Binary-coded data established by the pattern of actuated and unactuated switches in the plug is then recorded in the recording mechanism, in conjunction with the recorded data representing the meter readings of that particular station.

Therefore, in the practice of the invention, a serial number for any particular meter station can be established. This serial number can be set up merely by knocking out selected ones of the switch actuating pins in the receptacle at that station, so as to establish a desired binary-coded pattern by the remaining actuating pins in the receptacle. In like manner, the rate code and area code, for example, can be established for the particular station; as well as other pertinent information.

The receptacle to be described also includes a plurality of connector sleeves which receive respective ones of a corresponding plurality of connector pins which are mounted in the plug, along with the switches described above. These pin and sleeve combinations serve to establish connections from the analog-digital converter in the associated meter and the circuitry in the magnetic recorder, these connections being established when the plug is plugged into the receptacle associated with that particular meter.

In the manner described above, the binary-coded data from the converter, corresponding to the meter reading, can be recorded in the recording mechanism together with the binary-coded data representing the serial number, and with other binary-coded data representing other auxiliary data.

The connector sleeves in the receptacle and corresponding connector pins in the plug may be omitted, for example, in the semiautomatic type of system described in the copending application. In the semi-automatic system, the inspector reads the meter and makes appropriate manual settings in the recording mechanism itself. For this latter type of system, the same plugs and receptacles may be used, as a matter of convenience. However, no connections are made to the connector pins or to the sleeves, and the plug and receptacle assembly serves only to enable the serial number data and other auxiliary data to be recorded.

An object of the present invention, therefore, is to provide an improved plug-receptacle assembly which is particularly suited for establishing different binary-coded settings in an associated recorder, or the like, and of achieving this in a simple, straight-forward and inexpensive manner.

Another object of the invention is to provide such an improved plug-receptacle assembly which is capable of being easily and quickly set to establish a desired binary-coded setting.

Yet another object is to provide such an improved plug-receptacle assembly which is inexpensive to construct, and which may be produced and adjusted to different binary-coded settings on a mass production basis.

Other objects and advantages of the invention will become apparent from a consideration of the following description, when the description is taken in conjunction with the accompanying drawings in which:

FIGURE 2 is a sectional view of the plug of FIGURE 1 taken substantially along the line 2—2 of FIGURE 1;

FIGURE 3 is a sectional view of the receptacle of FIGURE 1 taken substantially on the line 3—3 of FIGURE 1; and FIGURE 4 is a front view of the receptacle of FIGURE 1, in which certain of a plurality of actuator pins have been removed, so as to establish a binary-coded pattern in the receptacle.

Figure 1:
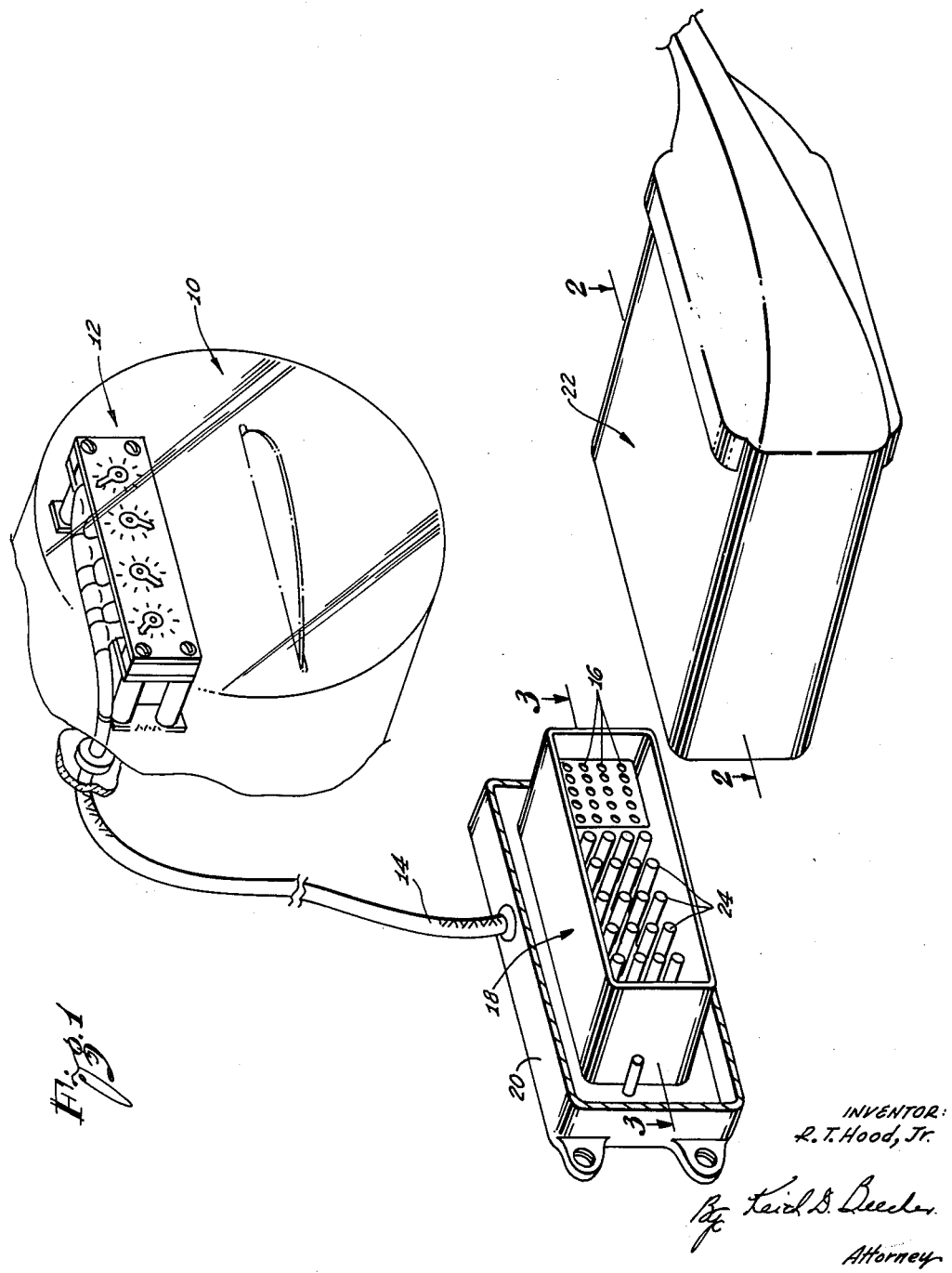
FIGURE 1 is a perspective view of a watt-hour meter connected to a receptacle constructed in accordance with the concepts of the invention; and of a plug adapted to be received by the receptacle, the plug also being constructed in accordance with the concepts of the invention.

In the perspective representation of FIGURE 1, a usual domestic watt-hour meter is shown, and an analog-digital converter 12 is mounted in the meter. The analog-digital converter 12 may be of the type disclosed and claimed in copending application 369,354, filed May 15, 1964.

The analog-digital converter 12 is coupled to the different indicator dials of the watt-hour meter 10, and it serves to convert the various dial readings into corresponding binary-coded signals, as fully described in the copending application 369,354.

The output terminals of the analog-digital converter 12 are connected, by way of a cable 14, to bank of sleeve-like electrical contacts 16 in a receptacle 18. The receptacle 18 is constructed in accordance with the concepts of the present invention, and it is mounted adjacent the meter 10. The receptacle includes, for example, an appropriate protective housing 20.

The receptacle and housing may, for example, be composed of an appropriate plastic, or they may be composed of any other suitable material.

In the practice of the invention, the meter inspector carries a recording mechanism from meter to meter. The recording mechanism is equipped with a plug 22 which also is constructed in accordance with the concepts of the invention. The plug 22 is plugged into the receptacle 18 at the different meter stations. In a manner described in detail in the copending application 369,354, the inspector plugs the plug 22 into the different receptacles, and causes the binary-coded signals corresponding to the different meter readings to be recorded on a magnetic tape in the recording mechanism.

The receptacle 18 also includes a plurality of switch-actuator pins 24. These pins 24 are mounted in the receptacle in such a manner that the individual pins can be easily fractured and removed from the receptacle.

The plug 22, as best shown in FIGURE 2, is composed of a multi-sectioned housing. The plug includes a housing section 50 which is adapted to receive a rear cover 52. The cover 52 is sealed to the housing 50 in any appropriate manner. The cover includes a central aperture 54.

The plug 22 also includes a forward housing section 56 which is secured to the housing section 50, and which incorporates an appropriate O-ring seal 58 between the two housing sections.

An insulating panel 60 is mounted in the housing section 56, and the panel 60, in conjunction with a layer of insulating material 62 serves to support a plurality of electric contact pins 64. These contact pins are adapted to mate with receptacle contact sleeves 16 in FIGURE 1 when the plug 22 is plugged into the receptacle.

The individual contact pins 64 are connected to the circuitry in the recording mechanism by electric leads 66. The leads 66 extend through the aperture 54 in the rear cover 52 of the housing 50, and they are formed into a cable 68 which extends to the recording mechanism.

In the manner described above, electrical connections are established between the electrical circuitry of the recording mechanism and the terminals of the analog-digital converter 12 in the meter 10. As fully explained in copending application Serial No. 252,726, filed January 21, 1963, the recording mechanism responds to the binary-coded information derived by these connections to record the binary-coded data corresponding to the particular meter reading.

The housing section 50 of the plug 22 also supports a pair of insulated supporting plates 68. These plates support a plurality of pairs of resilient leaf contacts 70. The contacts 70 of each pair are normally insulated from one another. However, when an associated switch armature is actuated, an electrical connection is made between the contacts of the corresponding pair. The contacts 70 of the different pairs are connected to the recording mechanism by way of appropriate electrical leads 69 which also extend through the cable 68.

A further pair of insulated plates 72 is mounted in the plug 22 between the housings 50 and 56. A plurality of plungers 74 are supported between the plates 62 and 72. A coil spring, such as the spring 76, is positioned around each plunger 74, so that the plungers are normally spring-biased to the left in FIGURE 2.

The plungers 74 are engaged by corresponding ones of the pins 24 in the receptacle 18 when the plug 22 is inserted into the receptacle. The ends of the pins 24 preferably have a concave configuration (FIGURE 3), to facilitate the engagement of the pins with the various plungers 74.

When a plunger 74 is engaged by a corresponding pin 24 in the receptacle 18, it is moved to the right in FIGURE 2 against the pressure of its corresponding spring 76. Switch armatures, such as a switch armature 78, are mounted on the right-hand ends of the plungers 74, and they extend between corresponding pairs of the resilient contacts 70.

The plug assembly of FIGURE 2 also includes a spring loaded plunger 75 at one side of the assembly. The plunger 75 establishes electric contact between a pair of resilient leaf contacts 71 when the plug 22 is properly inserted into the receptacle 18.

The contacts 71 are included in a solenoid circuit to energize a solenoid (not shown) only when the above mentioned electric contact is established between the contacts. The solenoid serves to lock the start mechanism of the recorder to which the plug 22 is connected; so that it is assured that the recorder may be started to record the information, only when the plug 22 is properly inserted in the receptacle 18. In this manner, false recordings due to misaligned insertions of the plug 22 are prevented.

A plunger switching assembly similar to that of the plunger 71 may be mounted at the other side of the plug. This latter switching assembly may be connected in series with that described in the preceding paragraphs. With such an arrangement, the recorder could be operated only when both plungers were actuated.

Conductive sleeves, such as the sleeve 80, are positioned on the armatures 78. The armatures are composed of a non-conductive material, so that when the plungers 74 are in the position shown in FIGURE 2, there is no connection between the corresponding pairs of resilient contacts 70. However, when a plunger 74 is moved to the right in FIGURE 2, its conductive sleeve 80 is moved between the corresponding pair of resilient contacts 70, so as to establish a connection therebetween.

The different plungers 74 in the plug 22 are intended to be engaged by corresponding ones of the actuator pins 24 in the receptacle 18, when the plug is received by the receptacle. If certain ones of the pins 24 are removed, however, then the plungers 74 corresponding to the removed pins 27 will remain in their unactuated condition.

It will be appreciated, therefore, that when the plug 22 is plugged into the receptacle 18, appropriate connections are established between the associated recording mechanism and the analog-digital converter 12 in the meter 10. These connections are made by way of the pins 64 in the plug and the sleeves in the receptacle. In addition, certain ones of the plungers 74 in the plug 22 are actuated, depending upon the pattern of pins 24 remaining in the particular receptacle 18.

In this manner, each receptacle may contain a different pattern of pins 24, so as to set up a different pattern of switch actuations in the plug 22, as the plug is plugged into the different receptacles. The pattern of actuations of the switches associated with the plungers 74 is used to establish a binary-coded pattern in the recording mechanism, so that additional binary-coded information is recorded along with the binary-coded information corresponding to the meter reading. The additional binary-coded information derived from the positions of the plungers 74 is used to identify the serial number of the particular meter station, as well as other auxiliary information, as mentioned above.

A particular advantage of the plug-receptacle assembly of the invention is the fact that identifying binary-coded information may be established at the various meter stations in a simple manner, and merely by the appropriate removal of selected ones of the pins 24 from the different receptacles. This means that there is no need to provide a separate power source at the different stations to establish the desired binary-coded identifying information. This also means that the different receptacles can be easily and cheaply manufactured with each receptacle representing a different binary-coded number, as determined by the number of pins 24 removed in each instance.

The sectional view of FIGURE 3 illustrates more clearly the actuator pins 24 in the receptacle 18, and the manner in which the pins are supported in the receptacle. Also shown clearly in FIGURE 3 is the manner in which the bank of connector sleeves 16 is supported in the receptacle. These sleeves are connected by appropriate leads 81 to the cable 14 which, as mentioned above, extends to the converter 12 in the meter 10.

The front view of the receptacle 18, shown in FIGURE 4, illustrates the manner in which the different switch actuator pins may be aligned to represent different binary-coded numbers, and the latter representation also shows the manner in which the different of the pins can be removed, so as to establish a desired pattern representative of particular binary-coded information.

The invention provides, therefore, an improved plug-receptacle assembly which is particularly adapted for use in a data acquisition system.

The improved plug-receptacle assembly of the invention provides a relatively simple and economical means whereby information may be acquired from utility meters, and the like, and by which, at the same time, identifying information may also be acquired from each meter station and recorded.

The structural composition of the improved plug-receptacle assembly is such that the identifying information may be established at each meter station in a simple and inexpensive manner, and without the need for extraneous power sources or the like.

While a particular embodiment of the invention has been shown and described, modifications may be made, and it is intended in the claims to cover such modifications as fall within the spirit and scope of the invention.

What is claimed is:

1. A plug-receptacle assembly including: a receptacle; a plug received in said receptacle in a plug-in mating relationship; a selected number of switch-actuating means mounted in said receptacle; and a predetermined number of separate switches, greater than said selected number of switch-actuating means, mounted in said plug, said switches including individual arms spring-biased from a first condition to a second condition and fixed contacts selectively electrically contacted by said arms, said arms being positioned in said plug in respective alignment with corresponding ones of said switch-actuating means, so that selected ones of said arms are actuated to said first condition by said switch-actuating means to establish electrical contact with respective ones of said fixed contacts when said plug is received by said receptacle.

2. A plug-receptacle assembly for use in a data acquisition system including: a receptacle; a plug received in said receptacle in a plug-in mating relationship; a selected number of switch-actuating means mounted in said receptacle and positioned to represent the binary digits of a particular value of at least one particular binary number; and a predetermined number of separate switches greater than said selected number of switch-actuating means mounted in said plug, and including corresponding arms individually spring biased from a first condition to a second condition and corresponding pairs of fixed contacts engaged by said arms, said arms being positioned in alignment with corresponding ones of said switch-actuating means so that certain ones of said arms are actuated to said first condition by said switch-actuating means to establish electrical contact between the fixed contacts of corresponding ones of said pairs when said plug is received by said receptacle, whereby the condition of said predetermined number of switches is representative of said particular binary number.

3. A plug-receptacle assembly for use in a data acquisition system including: a receptacle; a plug received in said receptacle in a plug-in mating relationship; a selected number of switch-actuating means mounted in said receptacle and positioned to represent the binary digits of a particular binary value of at least one binary number; a plurality of electrical connectors mounted in said receptacle; a predetermined number of separate switches greater than said selected number switch-actuating means mounted in said plug, and including individual arms in respective alignment with corresponding ones of said switch-atcuating means and individually spring-biased from a first condition to a second condition and corresponding pairs of fixed contacts engaged by said arms, said arms being located so that certain ones of said arms are actuated to said first condition by said switch-actuating means to establish electrical contact between the fixed contacts of corresponding ones of said pairs when said plug is received in said receptacle; and a plurality of further electrical connectors mounted in said plug in position to mate with respective ones of said first-mentioned electrical connectors when said plug is received by said receptacle.

References Cited by the Examiner

UNITED STATES PATENTS

| 1,207,812 | 12/16 | Stiles | 200—51.03 |
| 2,012,696 | 8/35 | Sorensen et al. | 200—51.1 |
| 2,148,500 | 2/39 | Potts | 324—113 |
| 2,782,275 | 2/59 | Vance | 200—47 |
| 2,892,008 | 6/59 | Cresswell et al. | 174—50 |

FOREIGN PATENTS 803,734  10/58  Great Britain.

KATHLEEN H. CLAFFY, Primary Examiner.

BERNARD A. GILHEANY, ROBERT K. SCHAEFER, Examiners.